United States Patent
Takeda

[11] Patent Number: 5,904,442
[45] Date of Patent: May 18, 1999

[54] BAND-SHAPED FITTING FOR A BICYCLE MOUNTED ON A COMPONENT OF A BICYCLE

[75] Inventor: Goro Takeda, Kyoto, Japan

[73] Assignee: Cateye Co., Ltd., Japan

[21] Appl. No.: 08/774,468

[22] Filed: Dec. 30, 1996

Related U.S. Application Data

[63] Continuation of application No. 08/321,237, Oct. 11, 1994, abandoned.

[30] Foreign Application Priority Data

Oct. 13, 1993 [JP] Japan .................................. 5-055371

[51] Int. Cl.$^6$ .................................................. F16C 1/10
[52] U.S. Cl. .................. 403/392; 74/551.8; 24/16 R; 24/16 PB; 24/282
[58] Field of Search .................... 403/392; 74/551.8; 24/279, 284, 282, 16 PB, 16 R

[56] References Cited

U.S. PATENT DOCUMENTS

| | | | |
|---|---|---|---|
| 4,615,185 | 10/1986 | Bollinger | 24/16 PB X |
| 4,805,856 | 2/1989 | Nicoli et al. | 24/16 PB X |
| 4,825,156 | 4/1989 | Read | 24/16 PB X |
| 5,065,562 | 11/1991 | Larsen et al. | 24/16 PB X |
| 5,088,159 | 2/1992 | Lafleur | 24/16 PB |
| 5,226,340 | 7/1993 | Takeda | 74/551.8 |

FOREIGN PATENT DOCUMENTS

| | | |
|---|---|---|
| 7278381 | 1/1982 | Australia . |
| 7988487 | 4/1988 | Australia . |
| 6674490 | 5/1991 | Australia . |
| 0 125 158 | 11/1984 | European Pat. Off. . |
| 0 642 971 | 3/1995 | European Pat. Off. . |
| 2652130 | 3/1991 | France . |
| 93 13 904.7 | 2/1994 | Germany . |
| 839263 | 6/1960 | United Kingdom . |

OTHER PUBLICATIONS

New Zealand No. 166,383 (Abstract), Feb. 1973.
New Zealand No. 179,204 (Abstract), Feb. 1977.

*Primary Examiner*—Terry Lee Melius
*Assistant Examiner*—Christopher J. Novosad
*Attorney, Agent, or Firm*—Olson & Hierl, Ltd.

[57] ABSTRACT

A protrusion provided at one end of a first fitting body is engaged with one of the recesses in a plurality of grooves provided at one end of a second fitting body in the lengthwise direction, whereby the degree of overlapping between the first fitting body and the second fitting body is adjusted. Then, the other end of the first fitting body and the other end of the second fitting body engaging with the recesses and protrusions of a fluted portion of a sensor portion are fixed with a fixing screw. Thus, the other end of the first fitting body and the other end of the second fitting body are drawn near to each other, and a fitting for a bicycle is firmly fixed to the fork or other part thereof.

12 Claims, 5 Drawing Sheets

FIG. 1
FIG. 2
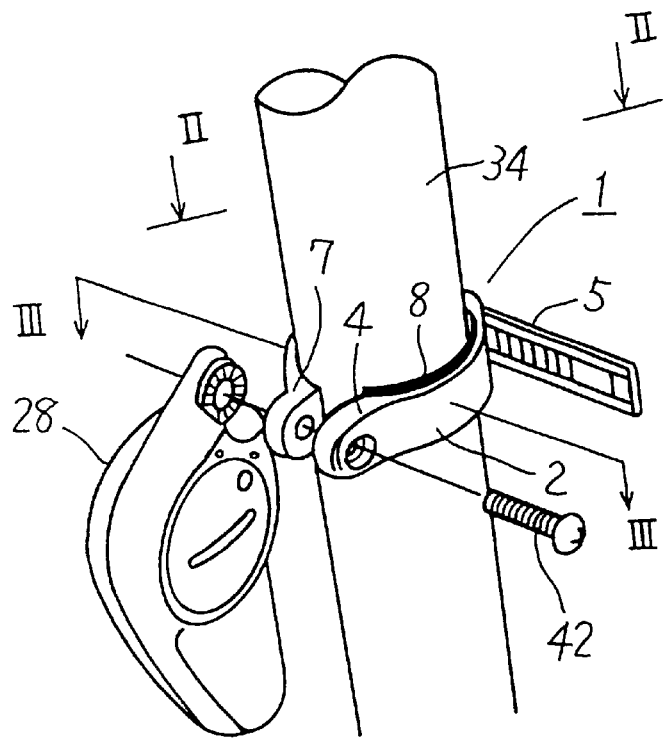
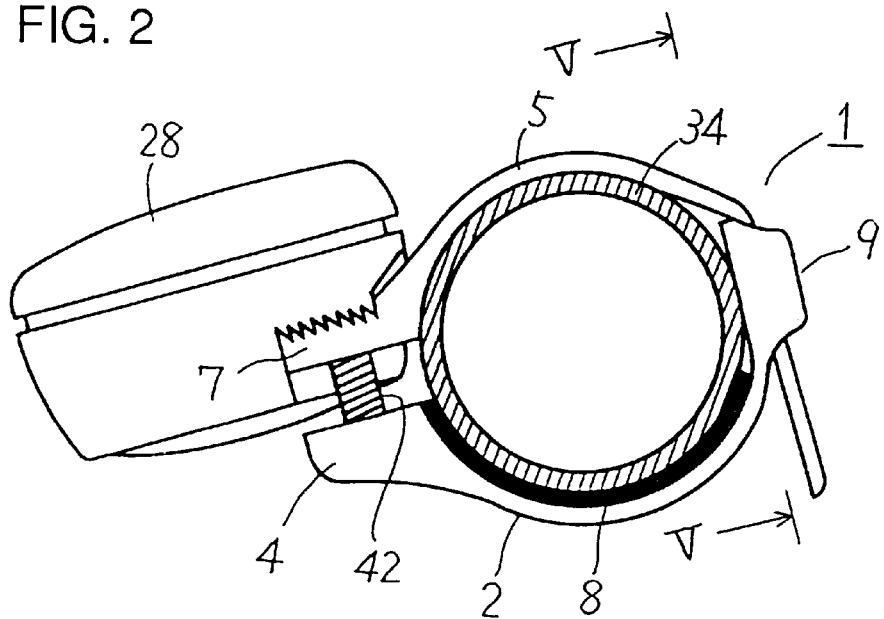

BAND-SHAPED FITTING FOR A BICYCLE MOUNTED ON A COMPONENT OF A BICYCLE

This application is a continuation, of application Ser. No. 08/321,237, filed Oct. 11, 1994, now abandoned.

BACKGROUND OF THE INVENTION

1. Field of the Invention

The present invention relates generally to fittings for a bicycle, and more specifically, to a fitting for a bicycle for mounting a device for bicycle such as a meter and a sensor on a component of a bicycle such as a handle and fork.

2. Description of the Background Art

In recent years, bicycles are sometimes provided with speed meters so that cyclists can be easily informed of travel speed, travel distance or the like.

FIG. 6 is a side view showing such a speed meter mounted on a bicycle, FIG. 7 is a view showing encircled portion "X" in FIG. 6 being enlarged, and FIG. 8 is an enlarged cross sectional view taken along line VIII—VIII in FIG. 7.

Referring to FIGS. 6 and 7, a speed meter 30 is mounted on the stem 31 of the handle of a bicycle 24. Front spokes 32 of bicycle 24 are provided with a magnet 26, and the portion of fork 34 corresponding to magnet 26 is provided with a sensor portion 28 for generating a signal every time magnet 26 passes in front of it.

The signal generated by sensor portion 28 is input to speed meter 30 through a cord 11, various operations are performed based on the signal in the meter, and information such as speed and travel distance is given to the user.

Now, referring to FIG. 8, how sensor portion 28 is mounted on fork 34 will be described.

A fitting for bicycle 36 for mounting sensor portion 28 on fork 34 includes a band-shaped fitting body 38 which can be engaged with the grooves and ridges of the fluted portion of sensor 28 on the outer periphery of one open end 25, a packing 40 fit along the inner circumference of fitting body 38, and a fitting screw 42 for fixing one end 25 of fitting body 38 engaged with sensor portion 28 and the other end 27.

Packing 40 is fit along the inner circumference of band-shaped fitting body 38, then both ends of fitting body 38 are opened to be fit around fork 34, and packing 40 will be fit along the inner circumference of fitting body 38 and the outer circumference of fork 34. Sensor portion 28 and the grooves and ridges of the fluted portion at one end 25 of fitting body 38 are engaged with each other, and then the one end 25 and the other end 27 of fitting body 38 and sensor portion 28 are fixed by fitting screw 42. Fitting body 38 is tightened to forks 34 through packing 40, and therefore sensor portion 28 will be fixed to fork 34 by means of fitting for bicycle 36.

Meanwhile, unlike such fitting for bicycle 36 using the fitting screw and the packing, there are fittings for bicycles of cord band type.

FIG. 9 is a perspective view showing how a sensor portion is mounted on a fork with a conventional fitting for bicycles of the cord band type, FIG. 10 is an enlarged cross sectional view taken along line X—X in FIG. 9, and FIG. 11 is an enlarged cross sectional view taken along line XI—XI in FIG. 9.

Referring to FIGS. 9 to 11, a fitting for a bicycle of the cord band type 44 for mounting a sensor portion 29 on a fork 34 includes an integral structure of cord band portions 46a, 46b having a shape like a cord band for bundling the cord of an electrical appliance, and a sensor portion 29. Cord band portion 46b has grooves and ridges of corrugation lengthwise on its outer circumference, and an engaging portion 48 having a protrusion 45 which can be engaged with one of the grooves of the corrugation is provided at an end of cord band portion 46a.

When mounted, engaging portion 48 is manually pressed and the end of cord band portion 46b on the side having the grooves and ridges of corrugation is pulled through engaging portion 48. Thus, the protrusion 45 of engaging portion 48 is gradually engaged with a groove of corrugation of cord band portion 46b near sensor portion 29, then the inner circumference of cord band portion 46b is pressure-contacted to fork 34 and sensor portion 29 is fixed to fork 34.

There are more than one kinds of shapes for the fork of a bicycle, and the forks of so-called mountain bikes are for example often larger than the forks of sports bikes.

The former fitting for a bicycle with a fitting screw and a packing can be adapted to forks of different sizes by changing the thickness of the packing to a limited extent, and fittings of different sizes such as large, medium and small must be usually prepared for one component for a bicycle.

Meanwhile, the latter fitting for a bicycle of cord band type can cope with forks of different sizes by adjusting the degree of tightening the cord band portion. However, since it is tightened in a stepped manner by each groove of corrugation, fine adjustment such as done with the screw type cannot be made. If the protrusion in engagement with one of the grooves of the corrugation is forced to engage with another groove closer to the sensor portion, the cord band portion can be cut away from the sensor portion. Furthermore, since the engaging force between the protrusion and the groove of the corrugation of cord band portion engaging therewith at the engagement portion is constant, tightening too much degrades the reliability of the engaged portion.

SUMMARY OF THE INVENTION

It is therefore one object of the invention to solve the above-described problems, and to provide a fitting for bicycle which can cope with bicycle components such as forks of different sizes with a single fitting body and a single packing, and permits tightening by fine adjustment.

Another object of the invention is to provide a fitting for a bicycle of the cord band type allowing high reliability at the engaged portion.

A band-shaped fitting for a bicycle to be mounted on a component of a bicycle according to one aspect of the invention includes a first fitting body having a shape fit along part of the outer circumference of the component and having a protrusion or recess at its one end, a second fitting body having a shape fit along part of the outer circumference of the component and having a plurality of recesses or protrusions each engageable with the protrusion or recess at its one end and in the lengthwise direction, overlapping adjustment means for adjusting the degree of overlapping between the first fitting body and the second fitting body, and means for drawing near the other end of the first fitting body and the other end of the second fitting body.

Therefore, according to this aspect of the invention, the protrusion or recess provided at one end of the first fitting body is engaged with one of recesses or protrusions provided at one end of the second fitting body, the degree of overlapping is adjusted, the other end of the first fitting body and the other end of the second fitting body are drawn near to each other, and a device for bicycle can be mounted on a bicycle.

A band-shaped fitting for bicycle to be mounted on a component of a bicycle according to another aspect of the invention includes a band-shaped main body, a protrusion or recess formed at one end of the main body, a plurality of recesses or protrusions formed at the other end and in the lengthwise direction of the main body and each engageable with the protrusion or recess, and engagement means for engaging the protrusion or recess with one of the recesses or protrusions and increasing force for engaging the protrusion or recess with the recess or protrusion in response to a reaction from a component generated when tightening the main body to the component.

Therefore, according to this aspect of the invention, the force of engaging the protrusion or recess formed at the one end of the main body with one of the recesses or protrusions formed at the other end and in the lengthwise direction can be increased in response to the reaction generated when tightening the main body to the component of the bicycle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is an exploded perspective view for use in illustration of how a sensor portion is mounted on a fork with a fitting for a bicycle according to one embodiment of the invention;

FIG. 2 is an enlarged cross sectional view taken along line II—II in FIG. 1 showing a sensor portion mounted on a fork with a fitting for a bicycle;

FIG. 8 is an enlarged cross sectional view taken along line VIII—VIII in FIG. 7;

FIG. 9 is a perspective view showing a sensor portion mounted on a fork with a conventional cord-band type fitting for a bicycle;

DESCRIPTION OF THE PREFERRED EMBODIMENTS

Figure 3:
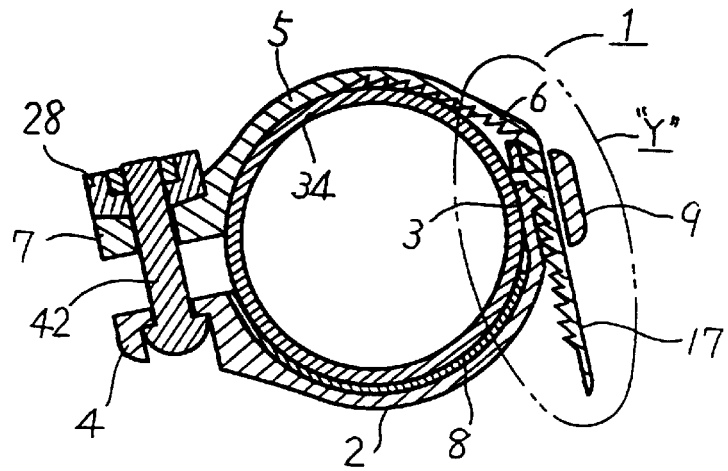
FIG. 3 is an enlarged cross sectional view taken along line III—III in FIG. 2 showing the sensor portion mounted on the fork with the fitting for a bicycle.

Referring to FIGS. 1 and 2, a fitting for bicycle 1 includes a first fitting body 2 and a second fitting body 5 having their one ends engaged with each other to form a band shape, a packing 8 provided along the inner circumference of first fitting body 2 and the outer circumference of a fork 34, and a fitting screw 42 for fixing the other end 4 of first fitting body 2, and the other end 7 of second fitting body 5 in engagement with the (saw-toothed) grooves and ridges of a fluted portion of a sensor body 28.

Figure 4:
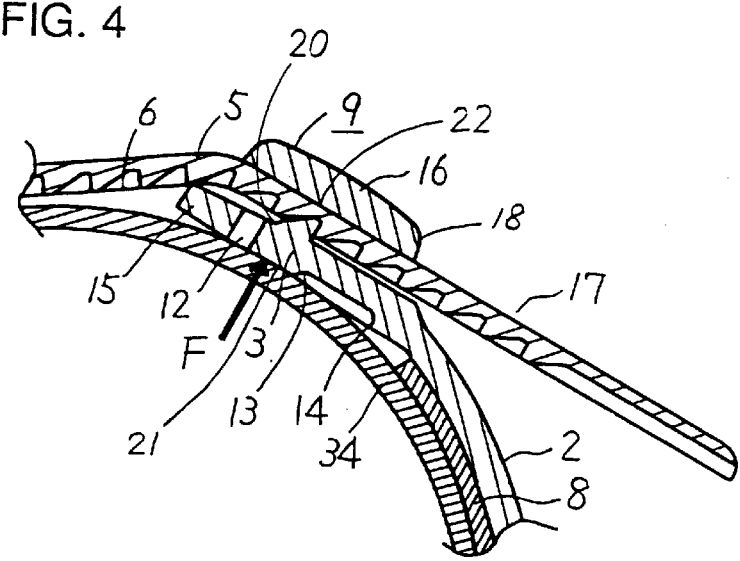
FIG. 4 is an enlarged view showing portion "Y" in FIG. 3.
Figure 5:
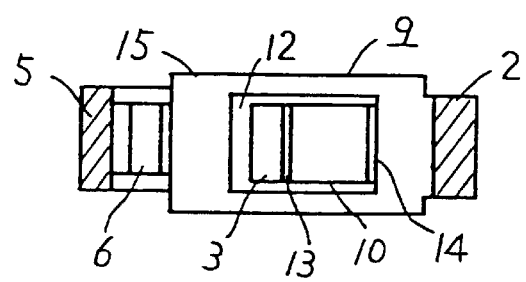
FIG. 5 is an enlarged sectional view taken along line V—V in FIG. 2 showing the fitting for a bicycle.
Figure 6:
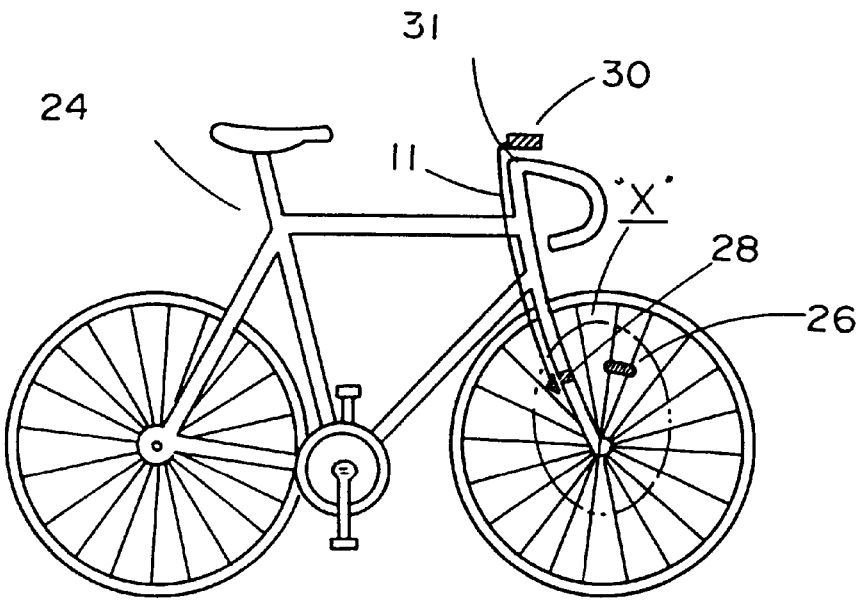
FIG. 6 is a side view showing a speed meter mounted on a bicycle.
Figure 7:
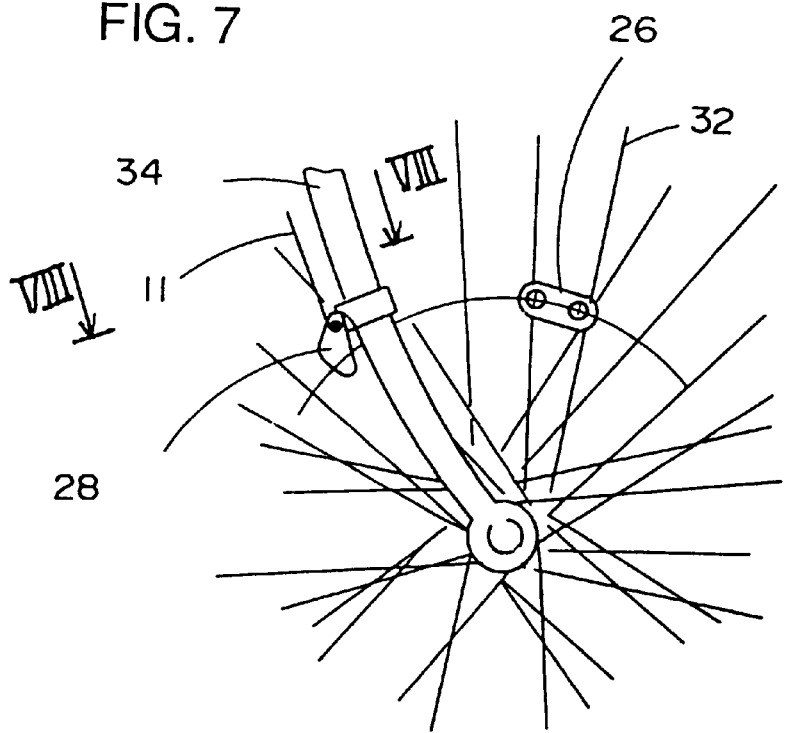
FIG. 7 is an enlarged view showing portion "X" in FIG. 6.
Figure 4:
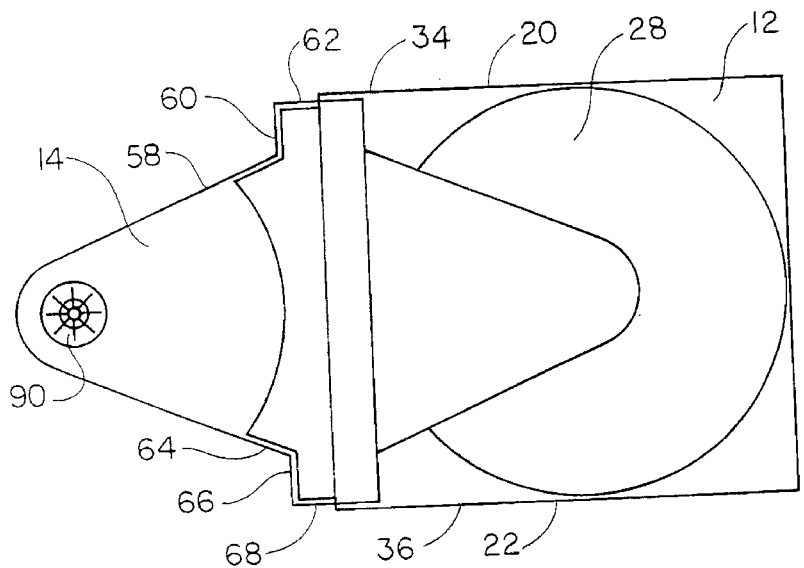
Figure 5:
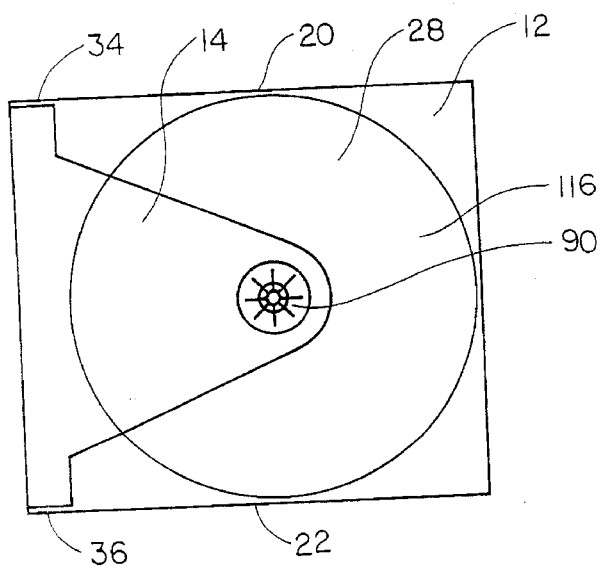
Figure 10:
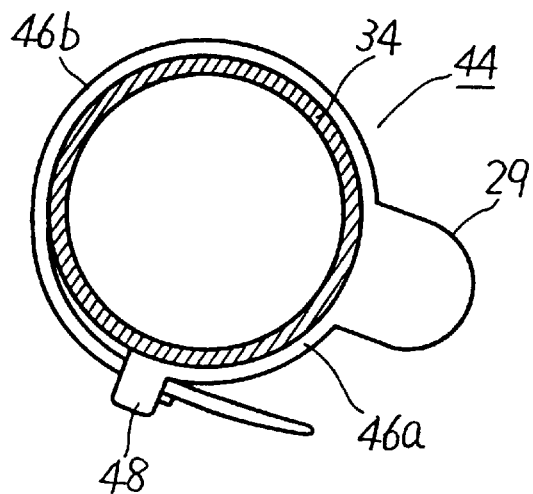
FIG. 10 is an enlarged cross sectional view taken along line X—X in FIG. 9.
Figure 11:
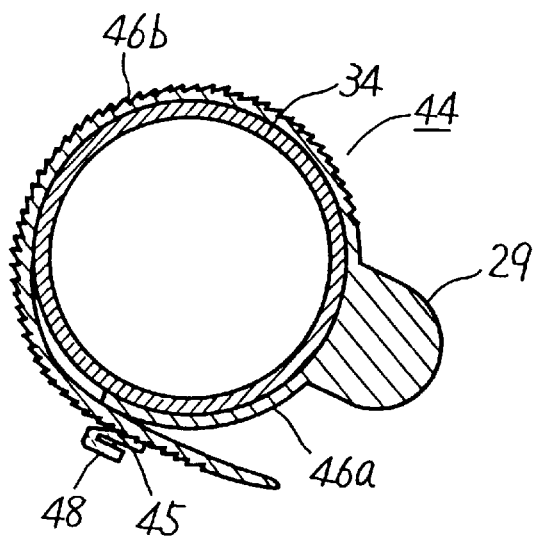
FIG. 11 is an enlarged cross sectional view taken along line XI—XI in FIG. 9.

Referring to FIGS. 3 to 5, a fitting for bicycle 1 will be described in more detail.

One end 9 of first fitting body 2 which is hollow inside has a first member 15 to be fit to a long fork 34 having a plate shaped elastic body 10 defined by a U-shaped opening 12 as illustrated in FIG. 5 and a second member 18 raising opposite to first member 15 at a prescribed distance are overlapped with each other as shown in the side view in FIG. 2. More specifically, one end 9 of first fitting body 2 is formed of a hollow body 18. The elastic body 10 of first member 15 includes a protrusion 3 having a ridge of corrugation formed in a first inner surface portion 21 of hollow body 18 as illustrated in FIG. 4, and the thickness of protrusion 3 is larger than the other portion of elastic body 10, in other words the portion surrounded by line 13, line 14 and opening 12. Elastic body 10 which is formed of an elastic material such as plastic is capable of pivoting elastically around line 14.

Meanwhile, one end 19 of second fitting body 5 is formed of a plate member 17, and is provided with a plurality of grooves 6 having recesses engageable with the ridge 3 of corrugation of protrusion of first fitting body 2.

In order to fix sensor portion 28 to fork 34, one end 17 of second fitting body 5 is partially inserted into one end 9 of first fitting body 2. Packing 8 is then provided along the inner circumference of first fitting body 2, and first fitting body 2 and second fitting body 5 are engaged with each other at a prescribed position of fork 34. When one end 17 of second fitting body 5 extending from one end 2 of first fitting body 2 is pulled in this state, as elastic body 10 of first fitting body 2 elastically moves every time the protrusion of ridge 3 and the recess of grove 6 are engaged with each other, the degree of overlapping between one end 9 of first fitting body 2 and one end 17 of second fitting body 5 is adjusted. Thus, first fitting body 2 and second fitting body 5 are fit along the outer circumference of fork 35 with packing 8 partly therebetween. As the other end 7 of second fitting body 5 and the grooves and ridges of the fluted portion of sensor portion 28 are engaged with each other, fitting screw 42 is fixed, whereby the other end 7 of second fitting 5 and the other end 4 of first fitting body 2 are brought closely to each other, and sensor portion 28 is fixed to fork 34.

The degree of fixation is determined by the force for engaging the protrusion in the ridge 3 of first fitting body 2 with the recess in the groove 6 of second fitting body 5 and the degree of tightening fitting screw 42. Therefore, as illustrated in FIG. 4, the thickness of ridge 3 of first fitting body 2 is made larger than the thickness of the other portion of elastic body 10. Thus, as the degree of overlapping between first fitting body 2 and second fitting body 5 increases, reaction force F from fork 34 which relatively increases particularly acts strongly upon the outer surface portion 21 of hollow body 18 corresponding to the ridge 3 of elastic body 10, part of second member 16 which is the inner portion 22 of hollow body 18 is pressure-contacted to plate member 17, and the force of engaging one of the recesses of second fitting body 5 and the protrusion of first fitting body 2 increases.

As described above, first fitting body 2 and second fitting body 5 are overlapped with each other, and the adjustment which cannot be coped with the stepped adjustment with the protrusion in the ridge of first fitting body 2 and the recess in the groove of second fitting body 5 can be made using fitting screw 42, and therefore a device for bicycle such as a sensor can be mounted to components of bicycles such as forks having different sizes.

Note that although the invention has been described by way of illustrating an embodiment for mounting a sensor on the fork of a bicycle, the invention is not limited thereto, and any device other than a sensor may be mounted, or a device may be mounted on another component of a bicycle such as a handle rather than the fork.

Although a plurality of recesses are provided inside the second fitting body and in the lengthwise direction, a plurality of recesses may be provided outside such as the case of a fitting for bicycle of band type as described in conjunction with the conventional case.

Furthermore, the protrusion of the first fitting body corresponds to the ridge of corrugation, the number of which is one, but the number of protrusions may be more than one, and the shape is not limited to that of the corrugation.

As opposed to the one described in the embodiment, the protrusion in the ridge 3 of the first fitting body 2 may be formed into a recess, and a plurality of protrusions engaging therewith may be provided to second fitting body 5. In such a case, however, a plurality of recesses must be provided to the elastic body of first fitting body 2.

As in the foregoing, in an embodiment according to one aspect of the invention, as a ridge or grove and a groove or ridge formed at one ends of a first fitting body and a second fitting body are engaged with each other, the degree of overlapping is adjusted, the other ends are drawn near to each other, and the main body can be fixed to components of a bicycle having different sizes, so that it is not necessary to manufacture a plurality of kinds of such fittings for a bicycle, resulting in reduced cost.

In an embodiment according to another aspect of the invention, reaction generated when tightening the main body to a component of a bicycle increases the force for engaging a ridge or groove formed at one end of the main body and one of grooves or ridges formed at the other end in the lengthwise direction, resulting in increased reliability at the engaged portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A band-shaped fitting for a bicycle mounted on a component of a bicycle, said component having an outer circumference, said fitting comprising:
    a first fitting body having a shape which fits along part of the outer circumference of the component and provided with a first protrusion at one end, said first fitting body having an other end;
    a second fitting body having a shape fit along part of the outer circumference of the component and provided with a plurality of recesses at one end in the lengthwise direction, said recesses each engageable with said first protrusion; said second fitting body having an other end;
    overlapping adjustment means for adjusting the degree of overlapping between said first fitting body and said second fitting body by engaging said first protrusion with one of said recesses; and
    drawing means opposed to the overlapping adjustment means comprising a fastener for drawing near the other end of said first fitting body and the other end of said second fitting body.

2. A fitting for a bicycle as recited in claim 1, wherein said overlapping adjustment means includes fixing means for fixing said one end of said first fitting body and said one end of said second fitting body by engaging said first protrusion with one of said recesses.

3. A fitting for a bicycle as recited in claim 1, wherein said fastener drawing closer the other end of said first fitting body and the other end of said second fitting body to a smaller distance than an interval of said recesses.

4. A fitting for bicycle as recited in claim 1, wherein said overlapping adjustment means further includes
    a hollow body forming said one end of the first fitting body and having said first protrusion formed therein; and
    a plate member insertable into said hollow body forming said one end of said second fitting body and having said plurality of recesses formed at one surface,
    said hollow body includes:
    a first inner portion having said first protrusion formed therein;
    an outer portion formed at a position corresponding to said first inner portion for pressure-contacting the outer circumference of said component; and
    a second inner portion formed at a position opposing said first inner portion for pressure-contacting said plate member such that one of said plurality of recesses engages with said protrusion.

5. A fitting for a bicycle as recited in claim 1, wherein said fastener comprises a screw for fixing the other end of said first fitting body and the other end of said second fitting body.

6. A band-shaped fitting for a bicycle mounted on a component of a bicycle, said component having an outer circumference, said fitting comprising:
    a first fitting body having a shape fit along part of the outer circumference of the component and having a first protrusion at one end, said first fitting body having an other end;
    a second fitting body having a shape fit along part of the outer circumference of the component and having a plurality of recesses formed at one end in the lengthwise direction, said recesses each engageable with said first protrusion; said second fitting body having an other end;
    first fixing means for fixing one end of said first fitting body and one end of said second fitting body by engaging said first protrusion with one of said recesses; and
    second fixing means opposed to the first fixing means comprising a fastener for drawing near the other end of said first fitting body and the other end of said second fitting body for tightening the engagement of the first protrusion with said one of the recesses and retaining the fitting on said component.

7. A fitting for a bicycle as recited in claim 6, wherein said first fixing means includes:
    a hollow body forming one end of said first fitting body and having said first protrusion formed therein; and
    a plate member insertable into said hollow body forming one end of said second fitting body and having said plurality of recesses formed at one surface, and said hollow body includes:

a first inner portion having said first protrusion formed therein;

an outer portion formed at a position corresponding to said first inner portion for pressure-contacting the outer circumference of said component; and a second inner portion formed at a position opposing said first inner portion for pressure-contacting the other surface of said plate member such that one of said plurality of recesses engages with said protrusion.

8. A fitting for bicycle as recited in claim 6, wherein said fastener comprises a screw fixing means for fixing the other end of said first fitting body and the other end of said second fitting body.

9. A band-shaped fitting for a bicycle mounted on a component of a bicycle, said component having an outer circumference, said fitting comprising:

a first fitting body having a shape which fits along part of the outer circumference of the component, having one end formed of a hollow body, said first fitting body having an other end and having a protrusion formed in said hollow body;

a second fitting body having a shape which fits along part of the outer circumferences of the component, having its one end formed of a plate member insertable into said hollow body, said second fitting body having an other end, and having a plurality of recesses at one surface of said plate member in the lengthwise direction, said recesses each engageable with said protrusion; and a screw fixing member opposite the connection of the first fitting body and the second fitting body for fixing the other end of said first fitting body and the other end of said second fitting body at a prescribed distance.

10. A fitting for a bicycle as recited in claim 9, wherein the hollow body forming one end of said first fitting body is provided with an opening on a side surface, and said protrusion is formed at an elastic body expanding in the opening.

11. A band-shaped fitting for a bicycle mounted on a component of a bicycle, said component having an outer circumference, said fitting comprising:

a first fitting body having a shape which fits along part of the outer circumference of the component and having a first protrusion formed at one end and having an other end, a second fitting body having a shape which fits along part of the outer circumference of the component and having a plurality of recesses formed at its one end in its lengthwise direction and having an other end, said recesses each engageable with said first protrusion;

said first protrusion engaging a selected one of the recesses for adjusting the degree of fixing one end of said first fitting body and one end of said second fitting body in a stepped manner; and adjustment means opposite the connection of the first fitting body and the second fitting body comprising a fastener for fixing the other end of said first fitting body and the other end of said second fitting body at a prescribed distance.

12. A band-shaped fitting for a bicycle mounted on a component of a bicycle, said component having an outer circumference, said fitting comprising:

first and second fitting bodies, each covering substantially a half of the outer circumference of the component;

said first fitting body having one end provided with a first fastening member and an other end provided with a second fastening member in the form of a protrusion;

said second fitting body having one end provided with a third fastening member and an other end provided with fourth fastening member in the form of a plurality of recesses;

said second fastening member being engageable with said fourth fastening member;

said band-shaped fitting further comprising;

said second fastening member overlapping said fourth fastening member and movable with respect thereto for adjusting the degree of overlapping between said second fastening member and said fourth fastening member; and drawing means opposite the overlapping connection of the second and fourth fastening members comprising a fastener for tightening said first fastening member and said third fastening member, wherein said second and fourth fastening members are engaged at the opposite side of said drawing means, whereby said protrusion will engage a selected recess to retain the fitting in selected position on said component of a bicycle.

* * * * *